Jan. 7, 1930.  H. A. CARTWRIGHT  1,743,060
DIFFERENTIAL MECHANISM
Filed July 30, 1924   3 Sheets-Sheet 1

INVENTOR.
HORACE A. CARTWRIGHT.
BY
ATTORNEY.

Jan. 7, 1930. H. A. CARTWRIGHT 1,743,060
DIFFERENTIAL MECHANISM
Filed July 30, 1924 3 Sheets-Sheet 2
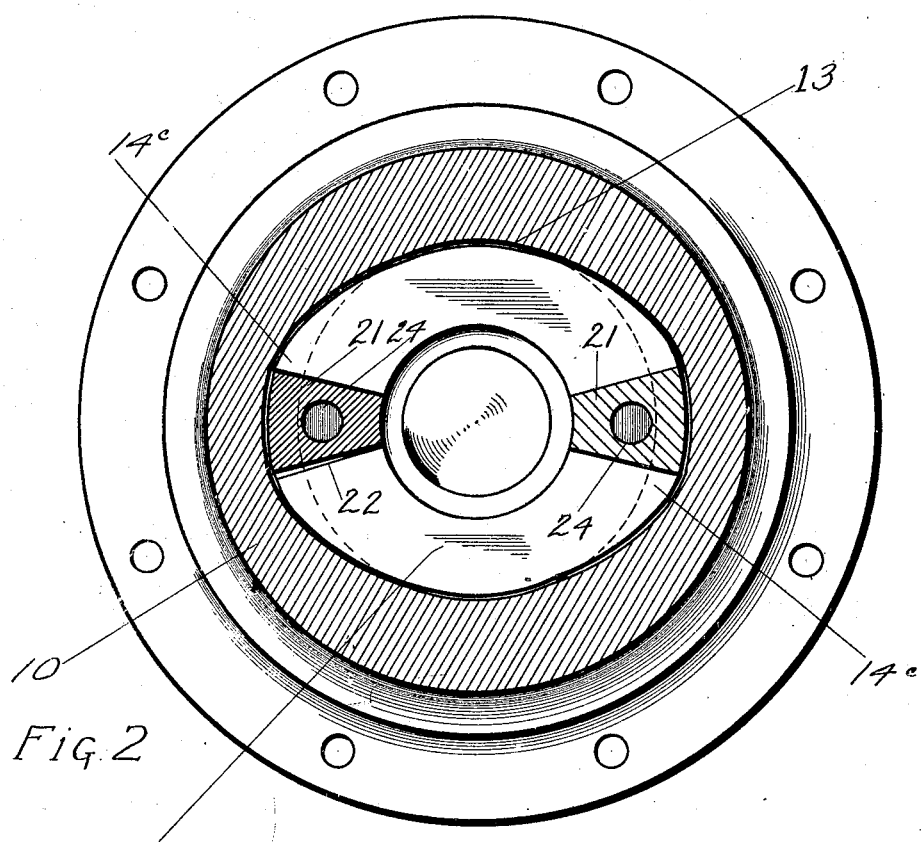
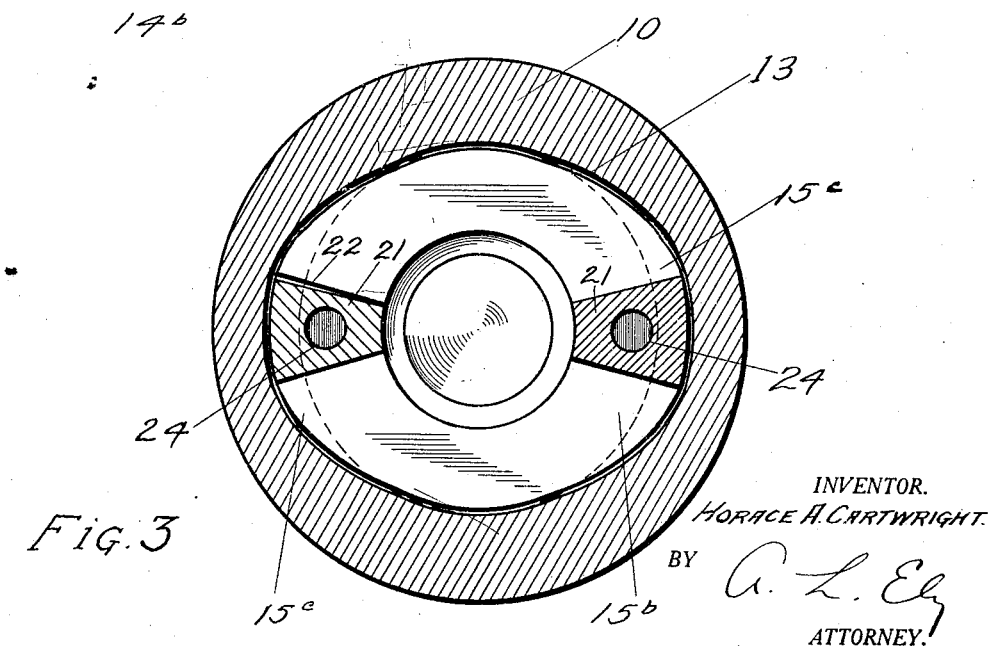
INVENTOR.
HORACE A. CARTWRIGHT.
BY
ATTORNEY.

Jan. 7, 1930.  H. A. CARTWRIGHT  1,743,060
DIFFERENTIAL MECHANISM
Filed July 30, 1924   3 Sheets-Sheet 3
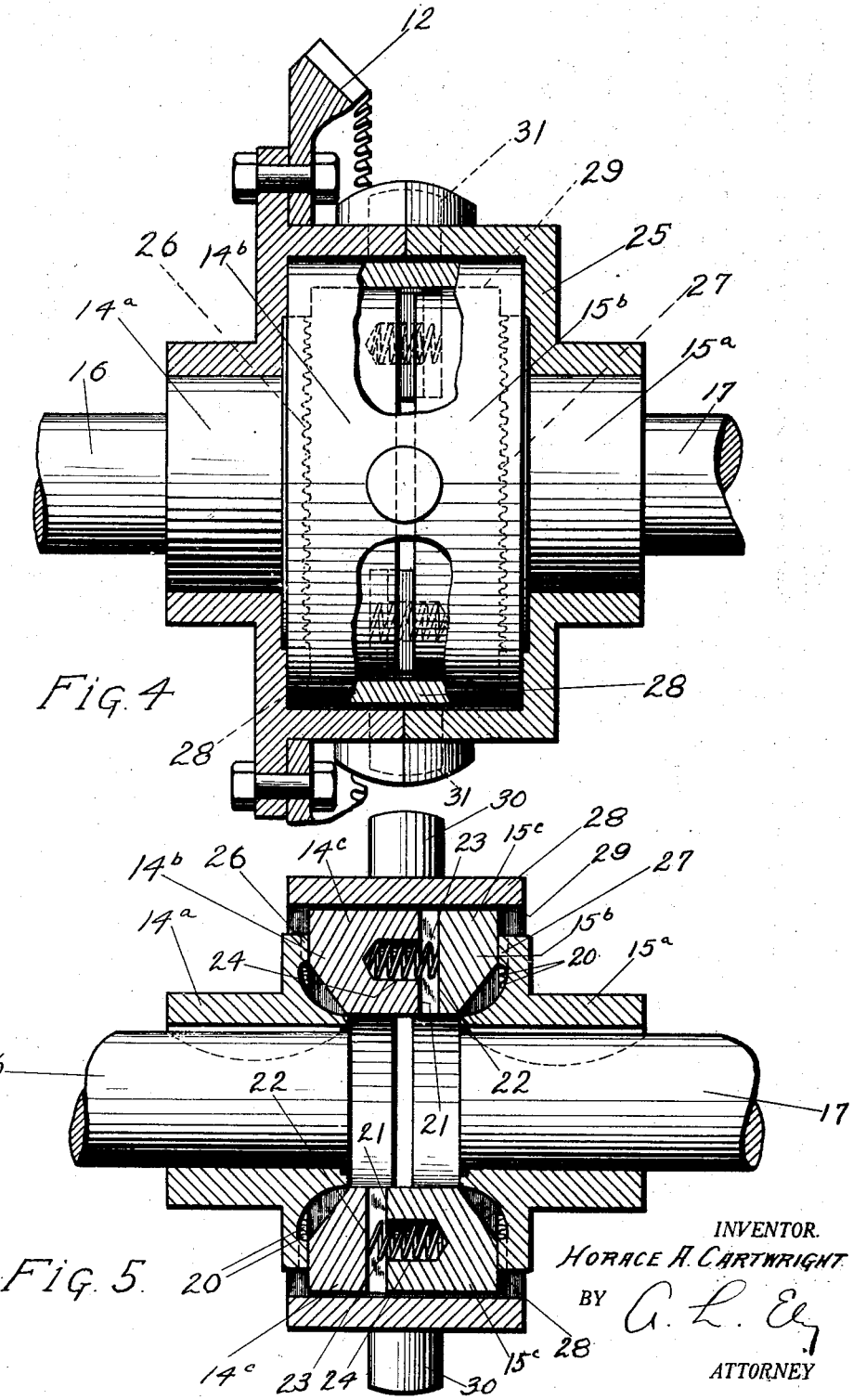
INVENTOR.
HORACE A. CARTWRIGHT.
BY
ATTORNEY Patented Jan. 7, 1930

1,743,060

UNITED STATES PATENT OFFICE

HORACE A. CARTWRIGHT, OF FREMONT, OHIO, ASSIGNOR TO THE CARWAL PRODUCTS COMPANY, OF FREMONT, OHIO, A CORPORATION OF OHIO

DIFFERENTIAL MECHANISM

Application filed July 30, 1924. Serial No. 729,181.

This invention relates to differential mechanisms and particularly to those in which the use of gears is dispensed with and clutches are substituted.

The chief object of the invention is to provide a simple but efficient differential of the type described above and one in which backlash will be reduced to a minimum. Other objects will appear as the following detailed description is read in connection with the accompanying drawings, it being understood that the invention is not limited to the specific structure shown or described.

Of the accompanying drawings:

Figure 1 is a transverse section, certain parts being shown in elevation, of a differential constructed according to the invention and so drawn as to illustrate the operation thereof when making a left-hand turn;

Figure 1ª is a left end elevation of clutch member 14ª;

Figure 2 is a section on line 2—2 of Figure 1;

Figure 3 is a section on line 3—3 of Figure 1;

Figure 4 is a section, partly in elevation, of a modified form of the invention, in which the improvement offered by the invention is adapted to be incorporated in a known type of differential housing for replacement purposes; and Figure 5 is a transverse section of the above mechanism as it appears before insertion into the housing.

Figure 1:
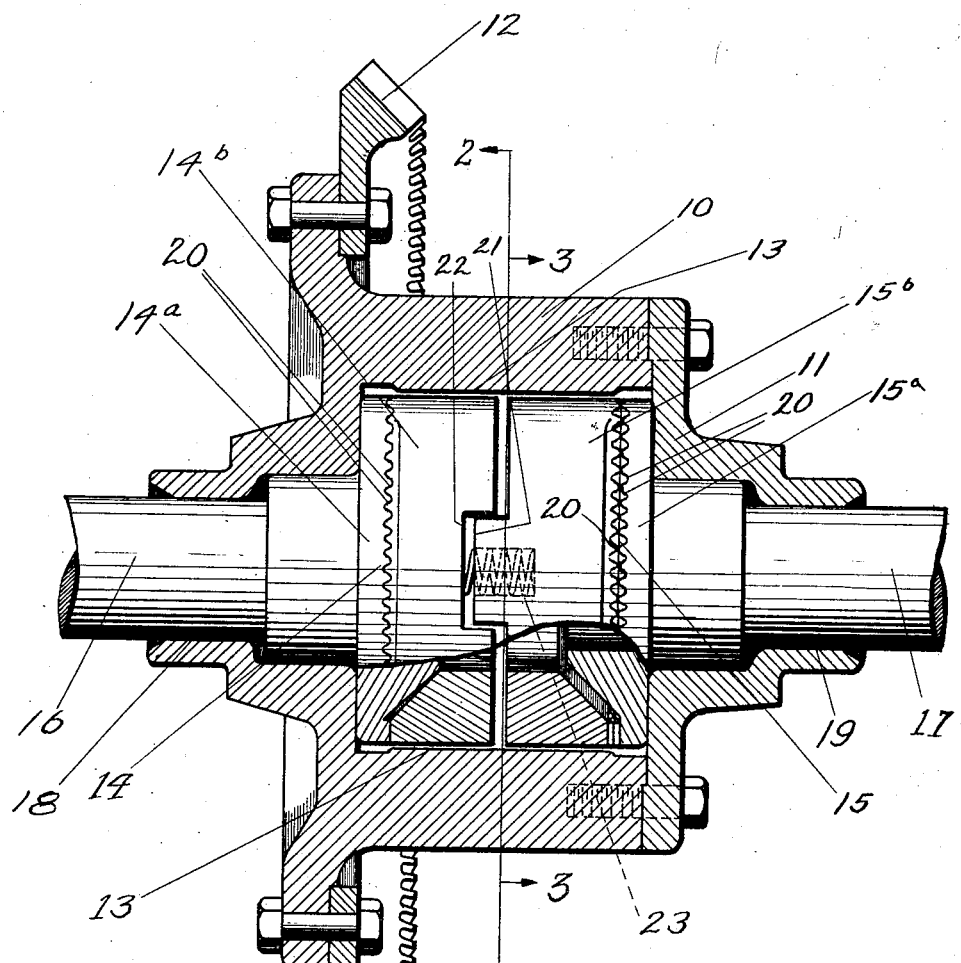
Figure 1A:
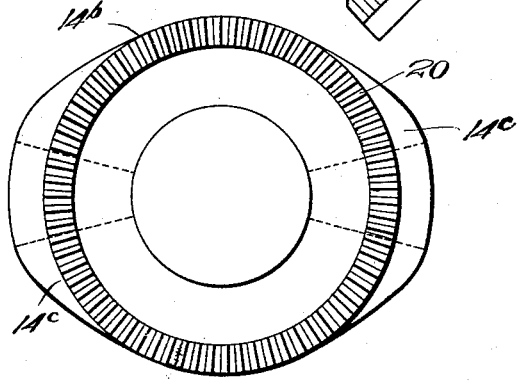

Referring to the drawings, 10 is a housing having a removable end plate 11 and adapted to be driven by a bevel gear 12 secured on the housing. For original equipment, the housing 10 is formed with a substantially elliptical, cylindrical, inner surface 13 adapted slidably to receive clutches 14 and 15. The clutch 14 has one circular, cylindrical member 14ª secured on the left axle member 16 and the clutch 15 has one circular, cylindrical member 15ª secured on the right axle member 17. The axle member 16 is journaled in a bearing 18 in the casing 10 and the axle 17 in a bearing 19 in the end plate 11.

The clutch 14 has a second member 14ᵇ arranged to slide within casing 10 into and out of engagement with the member 14ª, and the clutch 15 has a second member 15ᵇ arranged to slide into and out of engagement with clutch member 15ª. Clutch members 14ᵇ and 15ᵇ are adapted to be driven by cam portions 14ᶜ and 15ᶜ of the same shape as the inner surface of the housing 10, but of such size as to have a predetermined clearance or play therein for a purpose later to be explained. Both clutches have angular engaging faces formed with mating radial undulations, as indicated at 20, 20, whereby power may be transmitted to the axle members 16 or 17 in various relative positions of the clutch faces except positions in which they are entirely out of engagement.

Clutch members 14ᵇ and 15ᵇ have interlocking lugs and depressions respectively indicated at 21 and 22, the lugs 21 being adapted to have slight relative movement or play with respect to the depressions 22 for a purpose which will later become apparent. The parts 14ᵇ and 15ᵇ are also urged apart by suitable yielding means, such as coil springs indicated at 23, which may be seated in depressions such as shown at 24 in the lugs 21. The springs 23 tend normally to urge both clutches into engagement.

In operation, assuming the vehicle to be traveling in a straight line, both clutches 14 and 15 will be held in engagement and power will be transmitted through casing 10 to the drive cams 14ᶜ and 15ᶜ which drive both the clutch members 14ᵇ and 15ᵇ. Driving of the clutch members will be effected by binding of both the cams against the inner wall of the casing 10 in a manner similar to that shown in Figure 2. This binding of the cams in the casing will take place, of course, after the play or clearance is taken up. The surface pressure on the cams being high, a small coefficient of friction gives sufficient resistance to prevent the clutches disengaging by sliding relative to the casing.

As illustrated in the drawings, when rounding a corner or the like, the inside wheel will be positively driven, whereas the outer wheel will be permitted to travel faster than the clutch member normally controlling it. For example, in making a left-hand turn, as illustrated in the drawings, the left drive cam 14ᶜ will bind in the casing 10 and clutch member 14ᵇ will remain in engagement with clutch member 14ᵃ so as to drive the left wheel. Clutch member 15ᵇ, however, will be urged inwardly of the casing 10 by the action of undulations 20 of clutch member 15ᵃ on the undulations of clutch member 15ᵇ. This action will be effective to turn cam 15ᶜ out of frictional engagement with the casing 10 to permit its sliding inwardly thereof, but the latter action is so limited by the interengaging lugs 21 and depressions 22 that the cam 15ᶜ cannot be turned so far in the opposite direction as to enter into frictional engagement again with the casing. Accordingly, the clearance between the lugs 21 and depressions 22 is so determinated that when one cam, as 14ᶜ, is in frictional engagement with casing 10, the other will be held by the lugs 21, as will be evident from Figures 1 and 3, out of frictional engagement with the casing. Stated another way, the action of the cooperating undulations of clutch members 15ᵃ and 15ᵇ, when the right wheel is traveling faster than the left, will be such as to urge cam 15ᶜ out of frictional engagement with the casing by rotating the cam faster than, and therefore out of engagement with, the casing, and frictional engagement of the cam 15ᶜ with the casing 10, which might be caused by a continuation of the latter movement too far, is prevented by the movement of the lugs 21 into engagement with the walls of the depressions 22 as is illustrated in Figure 1. Thus when the vehicle is following a curved path, the faster wheel will cause the pressure on its drive cam to diminish to zero, whereby the slidable clutch member will be permitted to slide inwardly.

The advantages of the invention can be derived in a mechanism adapted to replace the parts of an old type of differential. This mechanism is illustrated in Figure 5 and shown in an old style housing in Figure 4. In this form, the housing 25 does not have the inner, elliptical, cylindrical surface for receiving the clutches and, accordingly, the latter, which are indicated at 26 and 27, are mounted in a sleeve 28 having an inner, elliptical, cylindrical surface 29 similar to the surface 13. The sleeve 28 has formed thereon radial pins 30, 30 engaged in bossed apertures 31, 31 formed in the casing 25, which apertures are adapted by engagement with the pins 30 to drive the sleeve 28. The remaining parts of the device are substantially the same, function in a similar manner and are given the same numerals in the drawings as the corresponding parts in the device shown in Figures 1 to 3, the parts, however, being shown in Figures 4 and 5 in their normal positions rather than when making a turn.

Modifications of the invention other than those disclosed herein may be resorted to without departing from the spirit thereof or from the scope of the appended claims.

What I claim is:

1. A mechanism of the class described, comprising a two part driving axle, a clutch member secured to each portion of said axle, a second clutch member normally mating with each first clutch member, a housing for said clutch members, the second clutch members being slidable in the housing, means to rotate the housing, the outer surfaces of said second clutch members being adapted to frictionally engage the housing when the latter is driven whereby the second clutch members will be normally held against sliding out of engagement with the first clutch members and will drive the first clutch members.

2. A mechanism of the class described, comprising a two part driving axle, a clutch member secured to each portion of said axle, a second clutch member normally mating with each first clutch member, said second clutch members being adapted to be urged out of cooperation with the first clutch members when said members are rotating differentially, a housing for the second clutch members the outer surfaces of the second clutch members being adapted frictionally to engage the housing to hold the second clutch members in engagement with the first clutch members and to drive the latter, each of said means being adapted to disengage from the casing so as to slide therein when their respective clutch members are rotating differentially.

3. A mechanism of the class described, comprising a two part driving axle, a clutch member secured to each portion of said axle, a second clutch member normally mating with each first clutch member, said second clutch members being adapted to be urged out of cooperation with said first clutch members when said members are rotating differentially, a cam on the outer surface of each second clutch member, a housing about said second clutch members adapted to permit lateral sliding of said cams therein but to prevent substantial relative rotation of the cams and housing, and means for driving the housing whereby the cams will frictionally engage the inner surface of the housing normally to prevent the second clutch members from sliding out of engagement with the first clutch members and to drive the latter, differential movement of each pair of mating clutch members being adapted to remove the respective cams from frictional engagement with the casing to permit the second clutch member to slide out of engagement with the first.

4. A mechanism of the class described, comprising a casing having an inner, non-circular, cylindrical surface, clutch members within the casing adapted to slide laterally therein but having cams formed thereon adapted to frictionally engage the inner surface of said casing to prevent any substantial relative rotation of the casing and clutch members, other clutch members normally mating with the first named clutch members, the other clutch members being secured respectively on each portion of a two part driving axle and being adapted to urge the first named clutch members out of engagement therewith when the clutch members are rotating differentially, and means for driving said casing.

5. A mechanism of the class described, comprising a casing having an inner, non-circular, cylindrical surface, clutch members within the casing adapted to slide laterally therein but having cams formed thereon adapted to frictionally engage the inner surface of said casing to prevent any substantial relative rotation of the casing and clutch members, said clutch members having interlocking lugs and depressions adapted to permit slight relative movement thereof, other clutch members normally mating with the first named clutch members, the other clutch members being secured respectively on each portion of a two part driving axle and being adapted to urge the first named clutch members out of engagement therewith by rotating the first named clutch members at a greater speed than the casing and sliding them laterally of the casing when the clutch members are rotating differentially, said interlocking lugs and depressions being such as to prevent the first named clutch members from being urged too far so as to engage the casing by a continuation of its movement at a greater speed than the casing.

6. In a differential mechanism, a two part rear axle, a clutch member fixed to each part of the axle, a second clutch member shiftable into and out of mating relation with each first-named member, and a driving member surrounding the second-named clutch members, each second-named clutch member being so formed as to fit loosely within the driving member, the inner surface of which latter is so formed that the second named clutch members are adapted to be brought into contact with the inner surface of the driving member to be driven thereby.

7. In a differential construction, a two part rear axle, a clutch member fixed to each part of the axle, a second clutch member shiftable into and out of mating relation with each first named clutch member, a non-circular, cylindrical formation on the second clutch members, and a ring shaped driving member having an inner non-circular, cylindrical surface loosely fitting over the second clutch members.

HORACE A. CARTWRIGHT.